(12) United States Patent
Tappan (10) Patent No.: US 8,186,399 B2
(45) Date of Patent: May 29, 2012

(54) AUTOMATED FLOOR BOARD TEXTURING CELL AND METHOD

(75) Inventor: John C. Tappan, Dry Fork, VA (US)

(73) Assignee: Unilin Flooring NC LLC, Thomasville, NC (US)

( * ) Notice: Subject to any disclaimer, the term of this patent is extended or adjusted under 35 U.S.C. 154(b) by 676 days.

(21) Appl. No.: 12/045,594

(22) Filed: Mar. 10, 2008

(65) Prior Publication Data

US 2009/0223600 A1 Sep. 10, 2009

(51) Int. Cl.
*B27H 1/00* (2006.01)
*B27M 1/00* (2006.01)

(52) U.S. Cl. ........................ 144/360; 144/356

(58) Field of Classification Search ............... 144/134.1, 144/136.1, 137, 156, 173, 344, 347, 348, 144/350, 360, 361, 368, 427, 428, 364; 700/245, 700/95
See application file for complete search history.

(56) References Cited

U.S. PATENT DOCUMENTS

| | | | |
|---|---|---|---|
| 3,703,198 A * | 11/1972 | Luebs et al. | 144/24.1 |
| 3,756,295 A | 9/1973 | Halop | |
| 3,942,021 A * | 3/1976 | Barr et al. | 250/559.44 |
| 4,945,959 A * | 8/1990 | Biedenbach | 144/137 |
| 5,430,658 A * | 7/1995 | Divinsky et al. | 700/138 |
| 5,544,757 A * | 8/1996 | Geiger et al. | 209/518 |
| 5,761,070 A * | 6/1998 | Conners et al. | 700/223 |
| 5,954,915 A * | 9/1999 | Voorhees et al. | 156/362 |
| 5,987,217 A | 11/1999 | Wisniewski et al. | |
| 6,066,367 A * | 5/2000 | Nishibori | 427/274 |
| 6,148,884 A * | 11/2000 | Bolyard et al. | 144/369 |
| 6,330,492 B1 * | 12/2001 | Wisniewski et al. | 700/245 |
| 6,502,002 B2 * | 12/2002 | Susnjara et al. | 700/95 |
| 6,609,546 B1 * | 8/2003 | Bobb et al. | 144/346 |
| 6,660,333 B2 | 12/2003 | Frame | |
| 6,816,164 B2 * | 11/2004 | Takata | 345/552 |
| 6,978,814 B2 * | 12/2005 | Van Capelleveen | 144/364 |
| 7,003,364 B1 * | 2/2006 | Hansson et al. | 700/98 |
| 7,100,341 B2 * | 9/2006 | McIlvaine | 52/745.2 |
| 7,108,031 B1 * | 9/2006 | Secrest | 144/358 |
| 7,243,469 B2 * | 7/2007 | Miller et al. | 52/311.1 |
| 7,255,040 B2 * | 8/2007 | Sjoberg | 101/33 |
| 7,357,959 B2 * | 4/2008 | Bauer | 427/262 |
| 7,437,278 B2 * | 10/2008 | Suzuki | 703/2 |
| 2003/0208980 A1 * | 11/2003 | Miller et al. | 52/592.1 |
| 2006/0156672 A1 * | 7/2006 | Laurent et al. | 52/589.1 |
| 2007/0275169 A1 * | 11/2007 | Pohlmann | 427/355 |
| 2007/0283648 A1 * | 12/2007 | Chen | 52/313 |

FOREIGN PATENT DOCUMENTS

EP 1398126 A1 * 3/2004
EP 1413411 A1 * 4/2004

* cited by examiner

*Primary Examiner* — David J. Walczak
*Assistant Examiner* — Jennifer C Chiang
(74) *Attorney, Agent, or Firm* — Capitol City TechLaw (57) ABSTRACT

An automated floor board texturing cell includes a programmable robot that stores, or has access to, a plurality of patterns. The robot automatically selects a stored pattern for at least one of the floor boards introduced into the cell. The robot textures the floor boards to exhibit the selected pattern. The robot may select a pattern for a batch of floor boards or for each individual floor board. Pattern selection can be random or based on stored information such as a production schedule.

14 Claims, 6 Drawing Sheets

AUTOMATED FLOOR BOARD TEXTURING CELL AND METHOD

BACKGROUND

1. Field of the Invention

The present invention relates in general to textured floor boards, and more particularly to a machine for texturing floor boards. The textured floor boards include but are not limited to floor boards with a wear surface that comprises natural wood, such as plain or solid wooden floor boards or floor boards comprising a wooden top layer, preferably a hard wooden top layer, glued on top of a core. Some example embodiments are applicable to floor boards without a natural wooden top layer. Here, the texture can be applied to a core material, such as to a core comprising particle board, MDF (medium density fiberboard), HDF (high density fiberboard), or synthetic materials.

2. Description of Related Art

Floor boards may be textured (e.g., scraped, distressed, routed, burned and/or gouged) to add richness and uniqueness to the exposed, major surface and/or to create antique looks on fresh floor boards. The texturing process may be performed by hand, by machine or by a combination of the two. Although conventional texturing techniques and machines are generally thought to provide acceptable results, they are not without shortcomings.

For example, hand-texturing may create a unique floor board surface. But hand-textured floors tend to differ in the amount and pattern of texture added. Hand-texturing results also tend to vary based on the skill of the artisan, the condition of the floor board and the condition and selection of texturing tools. The lack of control and expertise may lead to disastrous results. Even in those instances in which the results are satisfactory, hand-texturing is labor intense and tends to increase the cost of the floor covering.

Conventional machine-texturing, which is typically intended to provide a hand-made look, may provide reduced labor costs. However, conventional machine-texturing may result in pattern repetition and/or unacceptable variations in the appearance of the floor covering. For example, conventional machine-texturing can result in either a repeating pattern that is observable across an individual floor board and/or across a floor covering including substantially identical floor boards. Conventional machine texturing of floor boards with various dimensions in an economic way is not straightforward.

SUMMARY

According to an example, non-limiting embodiment, a machine for texturing a floor board may include a base supporting a moveable arm. A tool may be mounted on the moveable arm. According to another example, non-limiting embodiment, a machine for texturing a floor board may include a gantry supporting a moveable bridge, wherein a tool is mounted on the bridge. The tool may be present on a link that is moveable relative to the bridge. According to both embodiments, a support member may hold the floor board in a fixed position while the tool applies a texturing pattern to a major surface of the floor board. Preferably the machine for texturing the floor board allows the orientation of the tool to be altered with respect to the surface of the floor board. Such change in orientation can, e.g., happen in the course of texturing preferably without interruption of the texturing operation and/or preferably in a continuous fashion.

According to another example, non-limiting embodiment a method may involve introducing a floor board into a machining device. The machining device may select a texturing pattern from a plurality of stored texturing patterns. The selected texturing pattern may be machined into a major surface of the floor board, which means that the selected texturing pattern may be machined into at least one of the layers that contribute to the visual aspect of the floor board.

According to another example, non-limiting embodiment, a method may involve introducing a floor board into a machining device which is able to access or has itself a plurality of stored, preferably digitally stored, texturing patterns. Numerous and varied types of media can be used to effect the storage of the patterns, such as disks, tapes, the internal memory of a computer or plug-in memory devices. The patterns can also be accessed using a communication link, e.g., using an internet connection, such as a wireless internet connection. A plurality of the stored texturing patterns may be selected and merged together to create a new texturing pattern. The merging of patterns may involve composing a new pattern out of smaller patterns or parts thereof, and/or the superposition or blending of several preferably full patterns into one. The new texturing pattern may be machined into a major surface of the floor board or stored using one of the above-described methods.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Example, non-limiting embodiments of the present invention will become more fully understood from the detailed description below and the accompanying drawings, wherein like elements are represented by like reference numerals, which are given by way of illustration only and thus are not limiting of the present invention.

DESCRIPTION OF EXAMPLE, NON-LIMITING EMBODIMENTS

Figure 1:
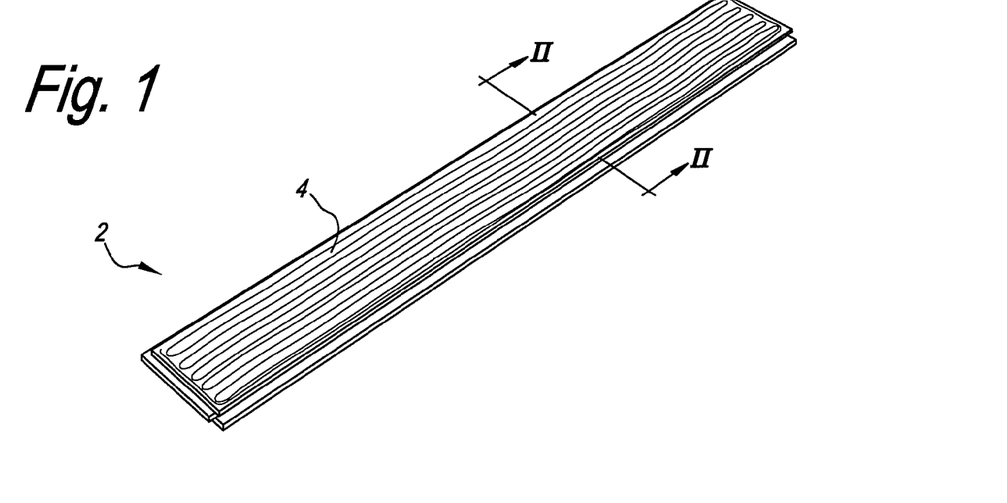
FIGS. 1-4 are schematic illustrations of a floor board, in this case with a solid wood structure, according to an example, non-limiting embodiment.

With reference to FIG. 1, an example floor board 2 includes a pair of opposed major surfaces, i.e., the larger upward and the larger downward facing surfaces. The opposed major surfaces are generally planar and generally rectangular shaped. A pair of long side surfaces and a pair of short side surfaces extend between the opposed major surfaces.

The upper major surface includes texture marks 4. In this example embodiment, the texture marks 4 are provided by an automated texturing operation as discussed in more detail below. In alternative embodiments, the texture marks may be provided by one or more automated operations including (but not limited to) scraping, denting, brushing, sanding, roughening, burning, sawing and/or routing. According to the present example, the texture marks 4 are essentially provided in the longitudinal direction of the floor board, i.e., essentially parallel to the long side surfaces. Substantially the entire upper major surface of the floor board is provided with the texture marks 4. The texture marks 4 illustrated here are applied to imitate wood from which wood portions have been removed from the surface by means of a tool, more particularly an imitation of so-called scraped wood. When imitating scraped wood or the like, preferably portions are removed that extend in the form of longitudinal paths. By way of example only, 3 to 6 longitudinal paths may be applied to the wear surface of a floor board. It will be appreciated that the automated texturing operation allows the number of longitudinal paths to be varied by switching patterns in between the texturing of subsequent floor boards or batches of floor boards.

Figure 2:
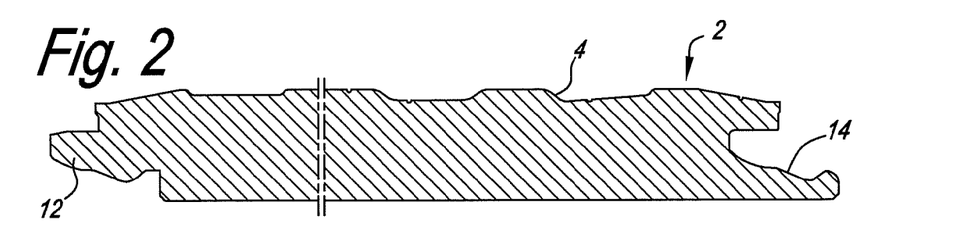
Figure 3:
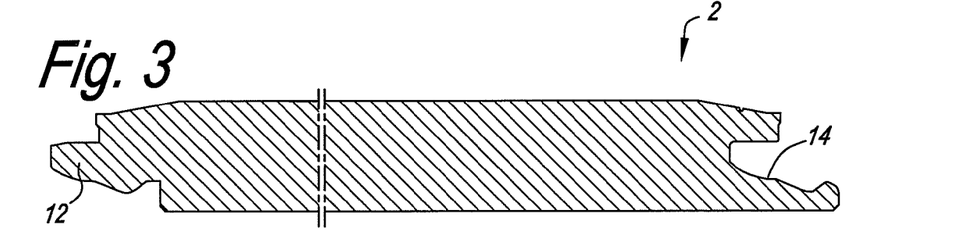

FIG. 2 is a cross-sectional view of the floor board 2 after the automated texturing operation, while FIG. 3 is a cross-sectional view of the floor board 2 before the automated texturing operation. FIGS. 2 and 3 illustrate that the upper major surfaces of the floor boards optionally are provided with sunken portions at the long side edges. Sunken portions can also be applied on the upper major surfaces at the short side edges or at the short side edges only. These sunken portions can be provided either prior to the texturing operation as illustrated by FIG. 3, while texturing, or after texturing. One or more of the texture marks 4 preferably extend into the sunken portions.

In both FIGS. 2 and 3, the long side surfaces of the floor board 2 are respectively provided with a tongue 12 and a groove 14 for the side-to-side connection of parallel floor boards. The short side surfaces of the floor board can also be respectively provided with tongue and groove features for the end-to-end connection of aligned floor boards. It will be appreciated that in alternative embodiments, one or more of the tongue and groove features may be omitted. The illustrated tongue 12 and groove 14 allow a glueless coupling of the floor boards. A traditional tongue and groove coupling at one or more edges, wherein the connection is preferably executed with application of glue, staples or nailing is also possible.

Figure 4:
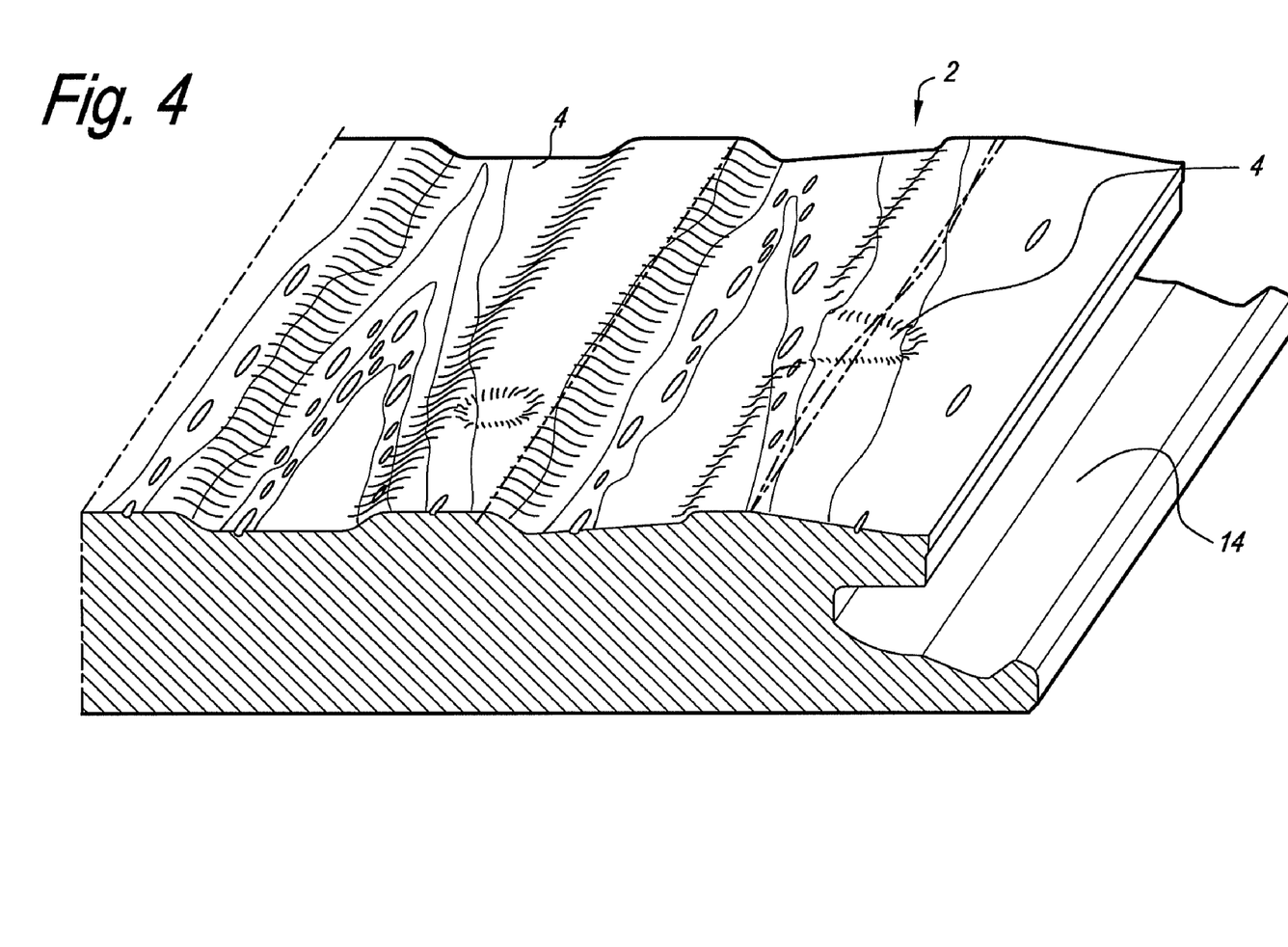

FIG. 4 is a partial perspective view of the floor board 2, which has a solid wood structure. By way of example only, the texture marks 4 include a series of peaks and valleys that extend continuously and in a generally longitudinal direction along the upper major surface of the floor board 2. In alternative embodiments, the peaks and valleys may extend in a discontinuous fashion and/or in varying directions and depths along the upper surface of the floor board. When providing a scraped wood look, local, more crosswise-directed removed portions or texture marks 4 can be applied. In addition to the texture marks 4 applied by automated machinery, other types of marks or textures may be present on the upper surface of the floor board. Such marks include the wood grain, worm holes, wood rot, stains, knots and/or other naturally occurring textures and defects.

Figure 5:
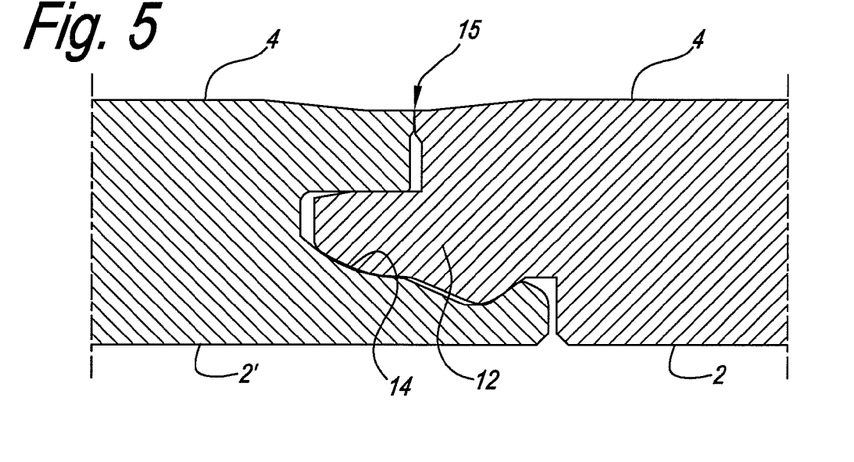
FIGS. 5-7 are schematic illustrations of alternative couplings between floor boards according to example, non-limiting embodiments.
Figure 6:
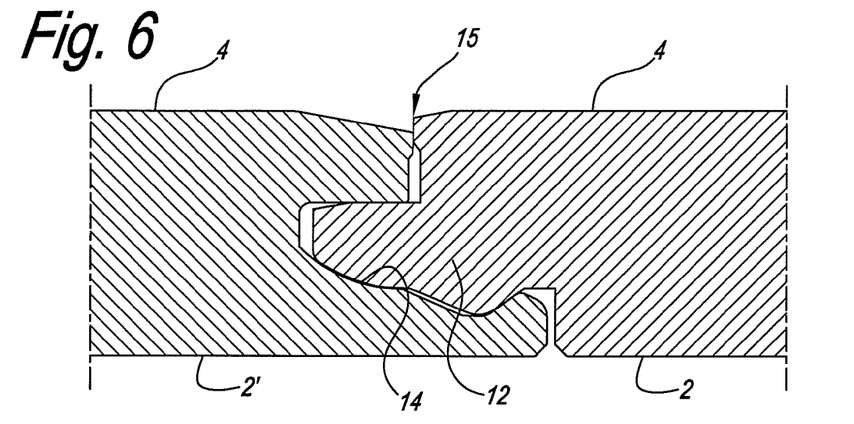
Figure 7:
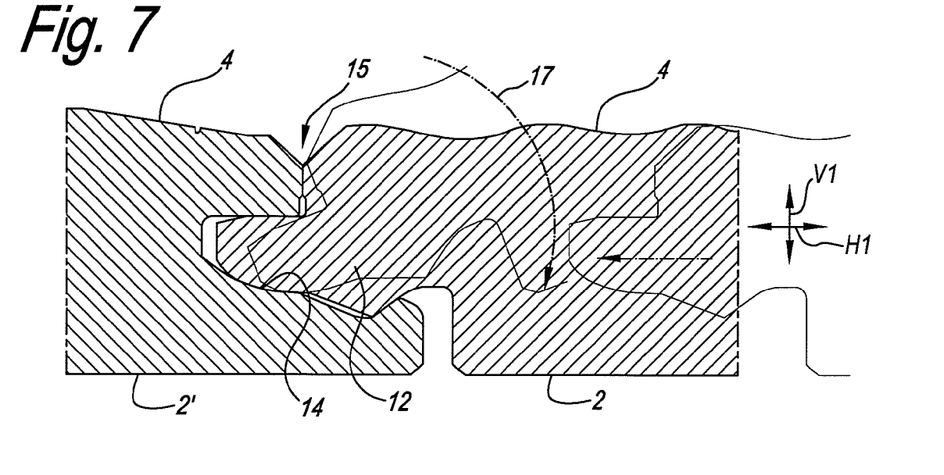

FIGS. 5-7 illustrate adjacent floor boards that may be coupled together according to example, non-limiting embodiments of the present invention. In all three embodiments, the tongue 12 of one floor board 2 is inserted into the groove 14 of another floor board 2'.

As shown in FIG. 5, the floor boards 2, 2' have upper major surfaces with respective long side edges that touch at the joint 15 between the floor boards. This gives the transition from one floor board to the next a smoothed or continuous appearance. Alternatively, as shown in FIG. 6, the floor boards 2, 2' may have upper major surfaces with respective long side edges that are spaced apart vertically at the joint 15. This gives the transition from one floor board to the next a rougher, more textured look. Another alternative is shown in FIG. 7, in which the upper surfaces of the floor boards 2, 2' have beveled long side edges that touch at the joint 15 to form an additional texture element, for example, an elongated channel. The edges of the upper major surface may be shaped to achieve the desired fit at the joint 15 by a milling operation that forms the tongue 12 and groove 14 and/or the automated machine operation that forms the texture marks 4. In the event of a separate milling operation, this operation can be executed prior to or after the automated machine operation that forms the texture marks 4.

FIG. 7 illustrates the manner in which the floor boards 2, 2' may be coupled together according to an example, non-limiting embodiment. Here, the tongue 12 of one board 2 is inclined and inserted into the groove of 14 of the other board 2'. After insertion, the board 2 is rotated (arrow 17) to complete the coupling. As shown, the tongue 12 and the groove 14 include cooperating features to achieve coupling in both a vertical direction (arrow V1) and in a horizontal direction (arrow H1). The embodiments depicted in FIGS. 5 and 6 are similar in this regard.

In an alternative embodiment, the coupling may be achieved by inserting the tongue of one board into the groove of another board by shifting the boards towards each other in a substantially horizontal fashion, i.e., essentially without inclining either board. During insertion, a lip of the groove elastically deflects to complete the coupling. The tongue and groove illustrated in FIG. 7 allows both insertion possibilities. It is however not excluded that only one of either rotating or horizontally shifting is possible.

According to still another example embodiment, which is not illustrated, the coupling is achieved by inserting the tongue of one board into the groove of another board with a downward vertical movement.

It will be readily apparent that the tongue and groove connections can be shaped to achieve mechanical coupling only in a horizontal direction or only in a vertical direction. For example, traditional tongue and groove features may be shaped to achieve a mechanical coupling only in a vertical direction.

FIGS. 1-7 illustrate floor boards having a solid wood structure, but the invention is not limited in this regard. For example, it will be appreciated that the features depicted in FIGS. 1-7 may be suitably applied to numerous and varied types of floor boards. Such floor boards may have a wear surface that comprises natural wood. In addition, the wear surface may further comprise one or more synthetic layers, such as lacquers, applied on top of the natural wood. Such a synthetic layer can be filled with abrasion resistant particles, such as aluminum oxide or the like. In general, the wear surface includes all layers or materials that contribute to the visual aspect of the floor board. It is this portion of the floor board that is subject to wear when in use. The synthetic layer is preferably applied at least partially, and more preferably applied wholly, after the texture marks 4 have been applied. In this way, it is possible that the texture marks 4 are applied in the natural wood that is comprised in the wear layer and that the texture marks 4 remain visible and/or palpable even when synthetic layers are applied on top of the already textured natural wood of the wear layer. In all cases, the texture marks 4 are considered as being applied to a major surface of the floor board.

Figure 8:
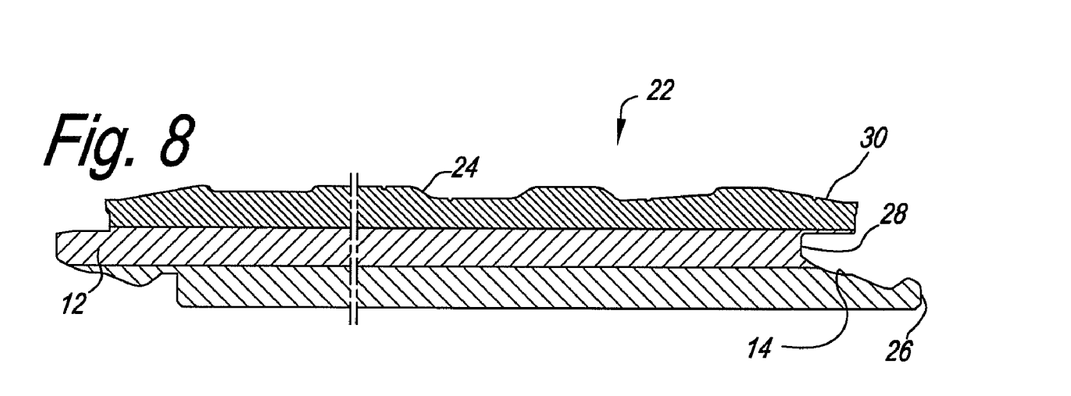
FIG. 8 is a schematic illustration of a floor board having a multi-layered structure according to an example, non-limiting embodiment.

FIG. 8 illustrates an alternative floor board 22 having a multi-layered structure, wherein the upper layer forms part of the wear surface of the floor board. By way of example only, the structure includes a lower ply 26, an intermediate ply 28 and an upper ply 30 that are laminated together. Such laminate structures and suitable ply materials are well known in this art. It will be appreciated that the laminate structure may include more or less than three plies. The upper ply 30 comprises natural wood, preferably hard wood.

The texture marks 24 are provided in the upper ply 30, and without extending through the upper ply 30. In alternative embodiments, the texture marks 24 may penetrate through the upper ply 30 and extend into and/or expose one or more of the underlying plies.

In alternative embodiments, texture marks may be provided on a floor board fabricated from engineered wood, composite wood and/or derivative wood products.

Figure 9:
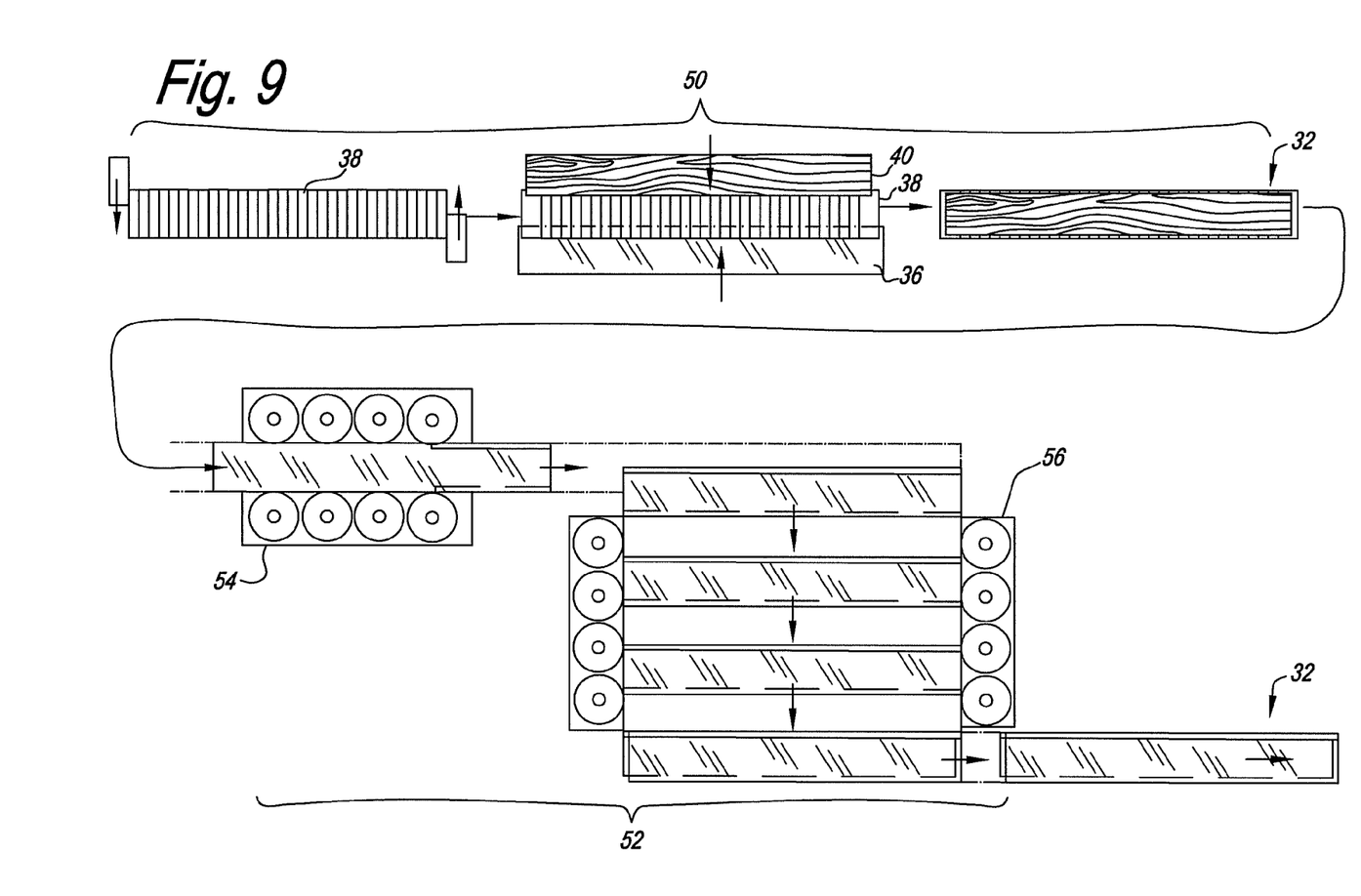
FIG. 9 is a schematic illustration of an assembly line according to an example, non-limiting embodiment.

FIG. 9 schematically illustrates a portion of an assembly line to manufacture "engineered wood" floor boards 32. The assembly line includes a plurality of cells, and mechanized material handlers (e.g., belts, rollers, guides, push members and/or moveable tables) that convey the floor boards 32 within each cell and between the cells. The assembly line may process the floor boards 32 in a continuous and consecutive fashion, and/or floor boards 32 may be processed by one cell and queued up in front of a subsequent cell (e.g., on pallets) to wait for further processing.

An assembly cell 50 prepares a core 38 from individual wood parts (e.g., wood strips, scraps and/or flakes). The individual wood parts can be soft wood parts, wherein the head and the tail, i.e. the short side surfaces of the core, are possibly formed by a composite wood part, such as an MDF or HDF strip. The core 38 is then sandwiched between a softer wood substrate 36 and a harder wood veneer 40. The various layers of material may be fixed together using a combination of pressure, temperature and adhesive(s), as is well known in this art.

It is clear that the assembly cell 50 described here can be replaced by another type of assembly cell, depending on the type of floor board to be produced. It can, e.g., be replaced by a sawing installation in case of solid wood or by a pressing and/or sawing installation in case of plywood floor boards. In general, such an assembly cell is preferably capable of providing panels having more or less the desired end-user format of the floor boards.

The floor boards 32 from the assembly cell 50 are fed into a milling cell 52. The milling cell 52 includes a first milling machine 54 that forms the tongue and groove on opposite lateral ends of the floor board 32. The milling cell 52 also includes a second milling machine 56 that forms the tongue and groove on opposite transverse ends of the floor board 32. Each of the first and the second milling machines 54, 56, respectively, includes cutting tools that rotate about a preferably fixed axis while the floor board 32 moves to accomplish the cutting action that forms the tongue and groove features. It is also possible to use one or more broaching tools or one or more non-mechanical cutting tools, such as a laser beam, preferably in combination with rotating milling cutters.

Figure 10:
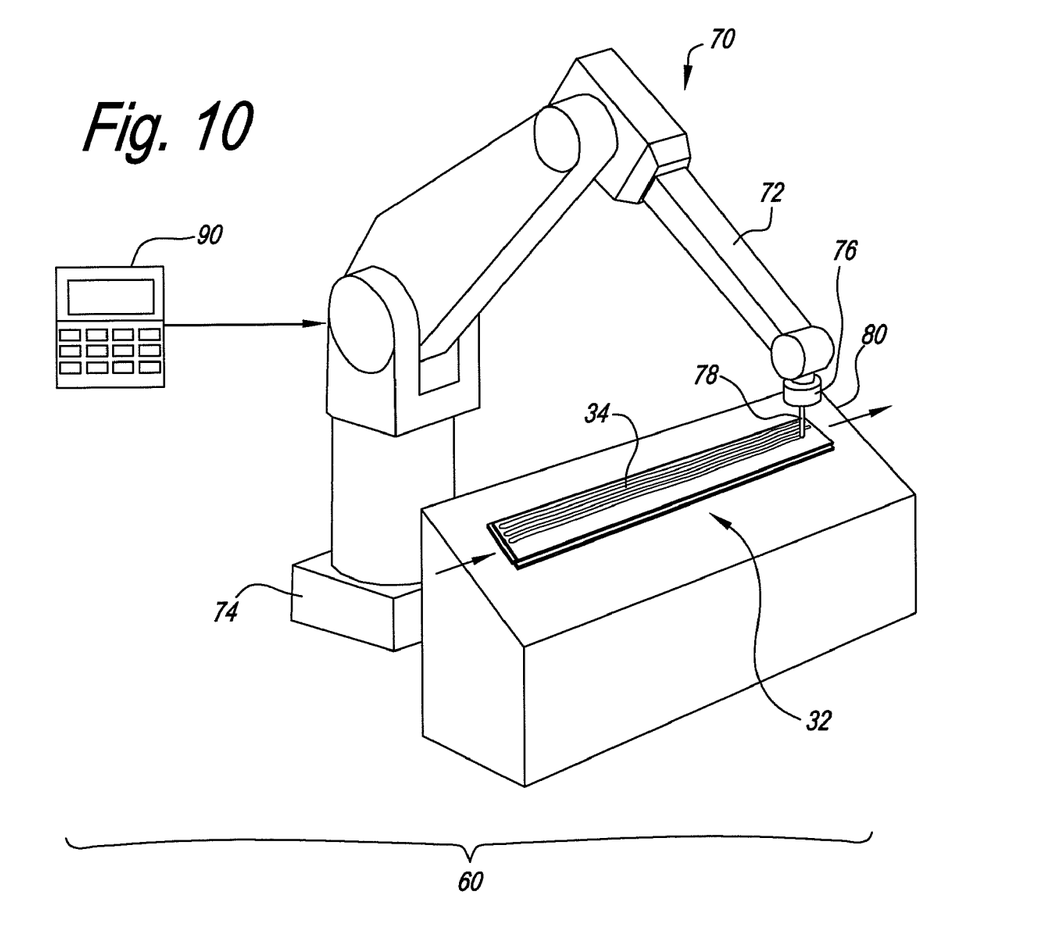
FIG. 10 is a schematic illustration of a texturing cell according to an example, non-limiting embodiment.

The floor boards 32 from the milling cell 52 are fed into a texturing cell 60, as shown in FIG. 10. The texturing cell 60 includes a robotic tool 70 that can be configured to perform a series of operations along the upper major surface of the floor board 32 to produce texture marks 34 on the floor board. In this example embodiment, the texture marks 34 are intended to give the upper major surface of the floor board 32 a hand-scraped appearance.

The robotic tool 70 has a tool arm 72 that extends from a base 74. The tool arm 72, which is capable of multi-axis movement, supports a milling unit 76 that may be motor driven. The milling unit 76 may be configured to receive a plurality of texturing tools 78 (e.g., a cutter, a burner, a router and/or a scraper) that can be utilized, either singly or in combination, to produce a variety of surface textures and patterns on the floor board 32 within the texturing cell 60. In the case where the texturing tool 78 is a cutter, preferably use is made of a cylindrical or ball head milling cutter.

The texturing cell 60 also includes a table 80 that supports the floor board 32. The table 80 holds the floor board 32 in a fixed position while the robotic tool 70 moves the selected texturing tool 78 along the upper major surface to produce the texture marks 34 on the floor board 32. The table 80 may include numerous and varied mechanisms, which are well known in this art, to fix the floor board 32 in position for the duration of the texturing operation. Such mechanisms include, for example, vacuum ports, retractable pins, clamps, stops, guide rails and/or roller elements. These mechanisms may be implemented alone, or in combination. The table 80 is fixed relative to the base 74 of the tool arm 72 to maintain registration between the tool 78 and the floor board 32. According to an alternative embodiment, the table may move during the texturing operation. Preferably the texturing cell, i.e., at least the table and the tool arm, is conceived such that the tool can perform a translation movement relative to the floor board at least in the three orthogonal directions, and can be oriented relative to the floor board by rotation around at least two axes.

According to an alternative embodiment, the texturing cell 60 may process several floor boards at once. Here, the floor boards can either be provided on the same table 80 or on separate tables. According to another variant, the texturing cell 60 may process blanks which have a format that is equal to or larger than two times the desired end-format of the floor boards. The blanks may be subsequently divided into the desired end-user format.

The floor boards in their end-user format preferably have a length ranging from 30 to 200 centimeters, and a width ranging from 6.5 to 30 centimeters. Preferably the texturing cell subsequently processes floor boards or blanks with the same overall dimensions. It is however not excluded that floor boards of different lengths and/or widths are subsequently machined. It is noted that especially when manufacturing solid wood floor boards or plywood floor boards that the length of the floor boards can vary randomly. This is especially the case when such floor boards are sawn in an attempt to avoid specific wood characteristics, e.g., wood knots, from being present on the floor boards. It is also noted that it is sometimes beneficial to the natural look of a floor covering to provide floor boards with at least two different lengths.

The robotic tool 70 is controlled by a master computer 90 that is pre-programmed with one or more patterns or is able to access one or more patterns. The master computer 90 directs the movements of the robotic tool 70 to generate texture marks 34 corresponding to one or more of the patterns on each of the floor boards 32.

The master computer 90 selects one or more patterns from the plurality of stored patterns for each floor board 32 or each floor board blank introduced into the texturing cell 60. The pattern selection can be performed by the master computer 90 automatically, without human intervention. Here, an operator monitoring the texturing cell 90 may not know beforehand the pattern selected by the master computer 90. It is possible that the texturing cell 60 comprises visualization means, by which the selected pattern can be visualized. The pattern selection can be random, or based on information (e.g., a production schedule) stored in or accessible by the master computer 90 or based on information sensed from the floor board (e.g., based on the length of the floor board). In the latter case, preferably the texturing cell is provided with sensing means, such as cameras or light sensors, for example. For batched machining, consecutive floor boards may have texture marks exhibiting the same pattern. Alternatively, consecutive floor boards may have texture marks exhibiting different patterns.

In an alternative embodiment, the master computer 90 may include functionality to merge together two or more of the pre-programmed patterns to produce a new composite pattern for machining a floor board 32. The merging of patterns can comprise composing a new pattern out of smaller patterns or parts thereof, or the superposition or blending of several preferably full patterns into one. For example, the master computer 90 may merge together two or more patterns associated with a specific tool (e.g., a scraping tool) to generate a new tool-specific pattern. Alternatively, the master computer may merge together two or more patterns respectively associated with a plurality of tools (e.g., a scraping tool pattern in combination with a burning tool pattern) to generate a new composite pattern.

In still another embodiment, the master computer 90 may include functionality to adapt pre-programmed patterns to produce a new pattern for machining a floor board 32. Such adaptation may include scaling and/or cropping the width, length and/or depth of the pattern, preferably in accordance with the length and/or width of the floor boards or blanks. Such functionality may be useful when floor boards having different lengths are fed into the texturing cell.

By virtue of the pre-programmed patterns, floor boards can be produced to tight tolerances. For example, the depth of the tool 78 can be controlled to avoid exceeding the desired depth of the scrape. In addition, the different patterns on the floor boards 32, may give the resulting floor covering a more random look, suppressing or altogether avoiding the "pattern recognition" phenomenon associated with conventional machine made texture marks. It will be appreciated that the patterns stored on or accessed by the master computer 90 can be transferred to other robotic tools to mimic the same look and this can be done without additional programming.

The floor boards 34 from the texturing cell 60 may be conveyed to other cells (not illustrated) to complete operations such as, for example, staining, embossing, sanding, denibbing, lacquering and/or other finishing operations, which are well known in the art. By way of example only, floor boards 32 having a plurality of patterns may be packaged together. Alternatively, a package may include floor boards 32 having related configurations, e.g., floor boards that include no burn marks, floor boards that each include a least one "worm" hole, or floor boards having substantially identical texture patterns. Here, the installer may select floor boards from numerous packages to control the degree of randomness or patterning in the final floor covering.

It will be readily apparent that example embodiments of the present invention also include floor boards that comprise texture marks as described above, and floor coverings that comprise such floor boards.

What is claimed is:

1. A method comprising:
   introducing a floor board into a machining device, the floor board having
   a major surface of natural wood that is rectangular in shape, and
   a pair of long side surfaces provided with tongue and groove features for the side-to-side connection of two of such floor boards;
   selecting a texturing pattern from a plurality of stored texturing patterns;
   machining the selected texturing pattern into the major surface of the floor board, the texturing pattern including texture marks that extend in a longitudinal direction of the major surface, wherein the tongue and groove features are formed by a separate milling operation that is performed prior to machining the selected texturing pattern; and
   after the machining, applying at least one synthetic layer on top of the major surface, the synthetic layer being a lacquer filled with abrasion resistant particles, wherein the texture marks remain visible and palpable when the at least one synthetic layer has been applied.

2. The method of claim 1, wherein only one texturing pattern is selected for consecutively introduced floor boards.

3. The method of claim 1, wherein a texturing pattern is selected for each consecutively introduced floor board.

4. The method of claim 3, further comprising:
   placing floor boards having a plurality of different texturing patterns in a single package.

5. The method of claim 3, further comprising:
   placing floor boards having identical texturing patterns in a single package.

6. The method of claim 1, wherein the texturing pattern is selected randomly by the machining device.

7. The method of claim 1, wherein the texturing pattern is selected by the machining device based on a characteristic of the floor board sensed by the machining device.

8. A method comprising:
   introducing a floor board into a machining device, the floor board having
   a major surface of natural wood that is rectangular in shape, and
   a pair of long side surfaces provided with tongue and groove features for the side-to-side connection of two of such floor boards;
   selecting at least two texturing patterns from a plurality of stored texturing patterns;
   merging together the selected texturing patterns to create a new texturing pattern;
   machining the new texturing pattern into the major surface of the floor board, the new texturing pattern including texture marks that extend in a longitudinal direction of the major surface, wherein the tongue and groove features are formed by a separate milling operation that is performed prior to machining the selected texturing pattern; and
   after the machining, applying at least one synthetic layer on top of the major surface, the synthetic layer being a lacquer filled with abrasion resistant particles, wherein the texture marks remain visible and palpable when the at least one synthetic layer has been applied.

9. The method of claim 8, wherein the selected texturing patterns are associated with one tool.

10. The method of claim 8, wherein the selected texturing patterns are associated with different tools, respectively.

11. The method of claim 8, wherein the new texturing pattern includes only portions of the selected texturing patterns.

12. The method of claim 8, wherein the new texturing pattern is based on the superposition of the selected texturing patterns.

13. The method of claim 1, wherein at least one texture mark extends continuously in the longitudinal direction substantially across the entire major surface.

14. The method of claim 8, wherein at least one texture mark extends continuously in the longitudinal direction substantially across the entire major surface.

* * * * *